Patented Nov. 26, 1946

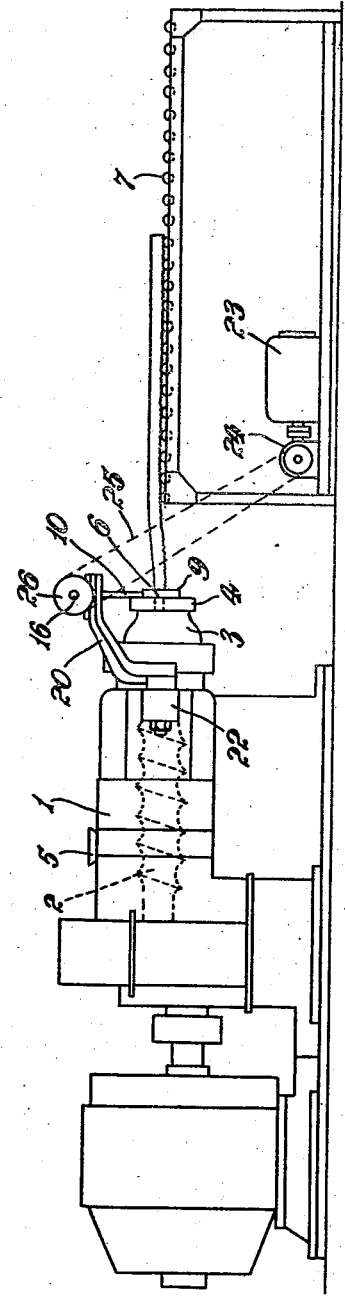

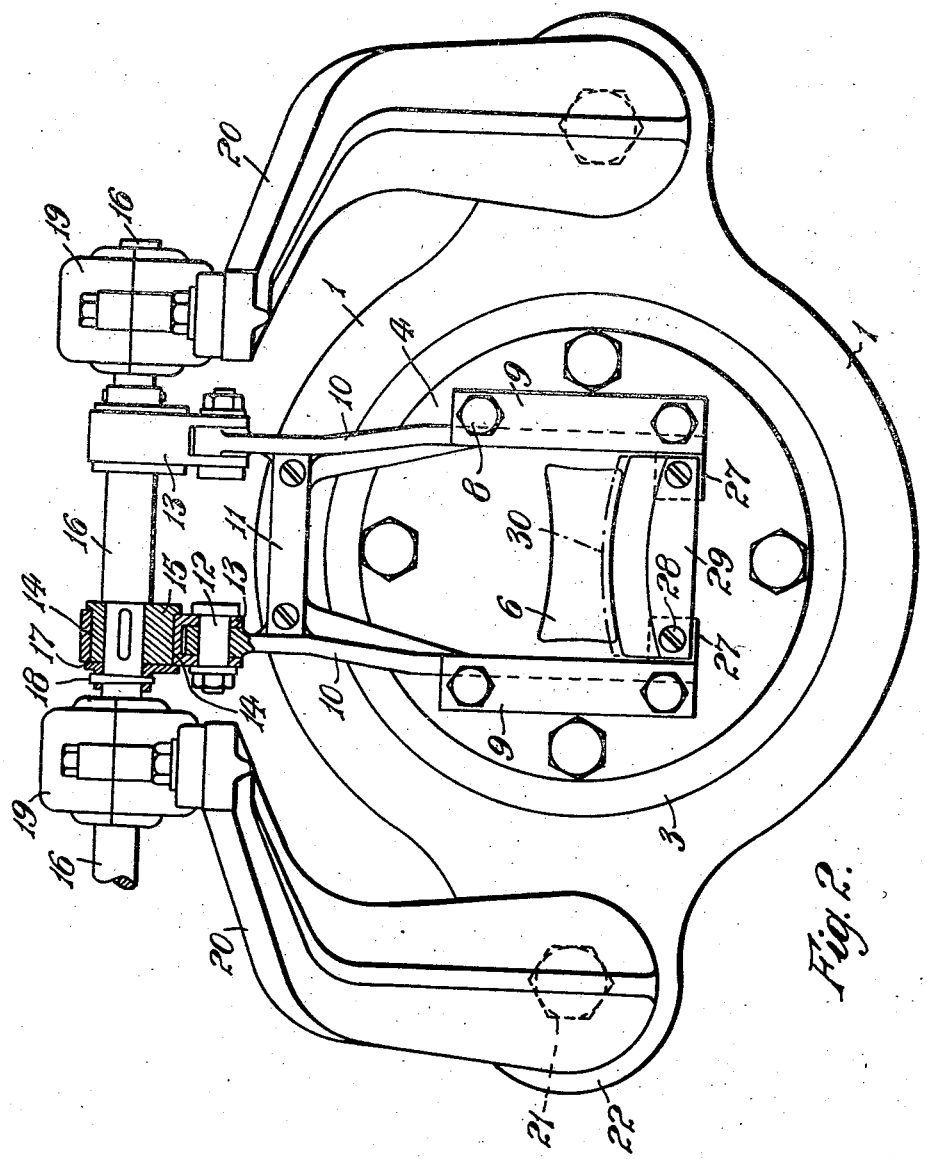

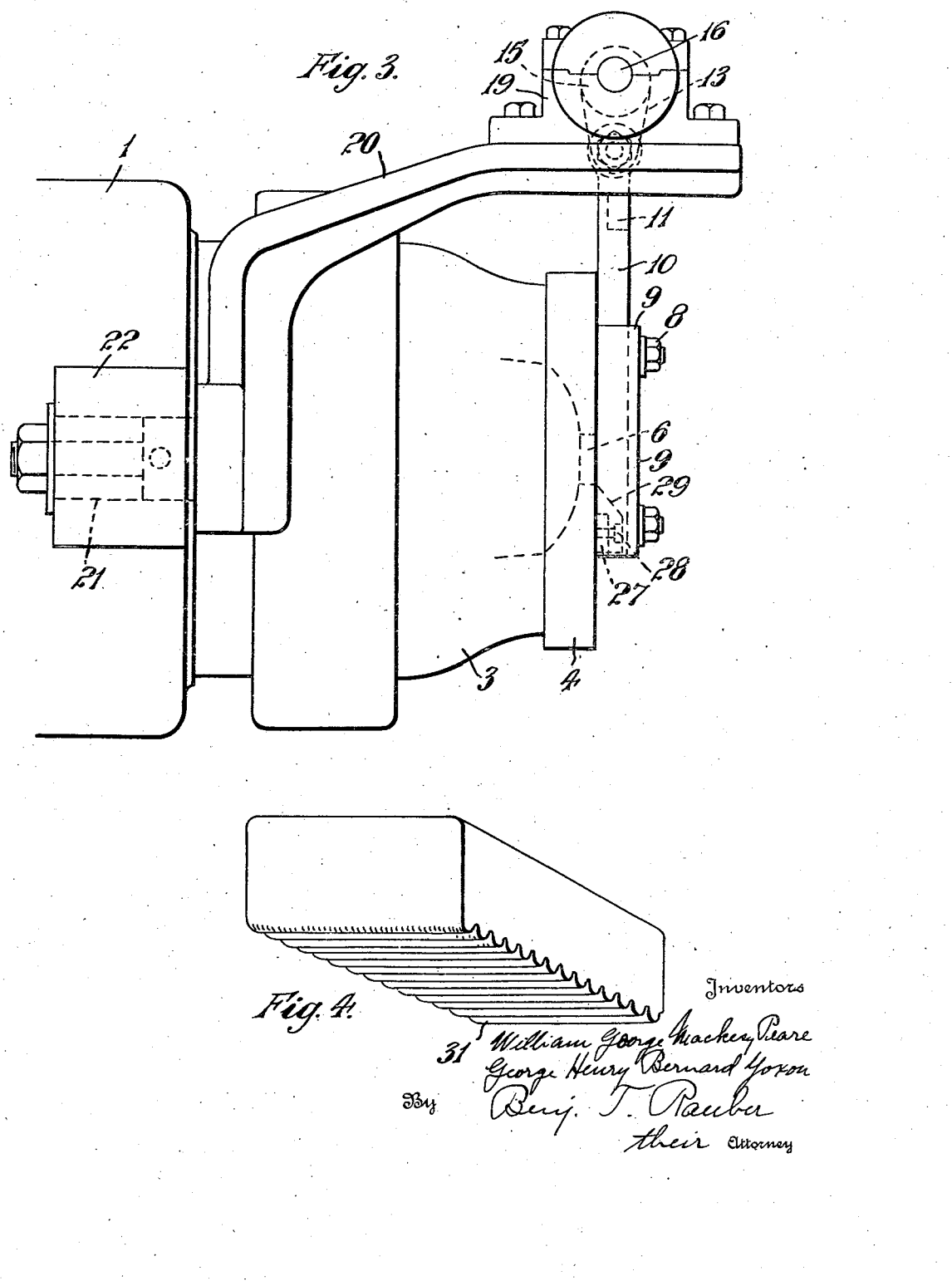

2,411,693

UNITED STATES PATENT OFFICE 2,411,693

PRODUCTION OF RAW TIRE STOCK

William George Mackesy Peare, Cork, Eire, and George Henry Bernard Yoxon, Erdington, Birmingham, England, assignors to Dunlop Rubber Company Limited, county of London, England, a British company Application June 20, 1944, Serial No. 541,210
In Great Britain April 28, 1943

3 Claims. (Cl. 18—47.5)

Our invention is concerned with the manufacture of tires of the kind comprising a body of rubber or the like vulcanised to a metal base band, and relates to the production of the said body of rubber, herein called the raw tire stock, by means of extrusion.

It is known that extrusion forms a "grain" in the stock which is prejudicial to good adhesion between stock and base band, and it has been proposed to break-up said grain by indenting the stock with a spiked roller. Such a device cannot be relied upon invariably to achieve the results which we now require and an object of the present invention is to provide for the breaking-up of the grain with the required thoroughness and certitude.

According to this invention we provide a method of producing raw tire stock from material such as compounded rubber or the like comprising the steps of extruding said material and ridging one of the surfaces of the extruded material while it is still in a plastic condition. Preferably said method comprises the steps of progressing the extruded material past a blade or the like and reciprocating said blade so that it cuts into said material as the latter so progresses.

Preferably said method is carried out by apparatus comprising a die for an extruder and, adjacent the face of said die, a blade adapted to reciprocate substantially parallel to said face, the provision for reciprocating said blade preferably comprising a rotary shaft associated with eccentric means connected to the blade by link means sliding in guides associated with the die face.

In order that the said invention may be easily understood and readily carried into effect, the same will now be described with reference to the accompanying drawings in which:

Figure 1 is a side view of extruder apparatus incorporating the ridging provisions according to our invention;

Figure 2 is a detail front view, partly in cross section, of the said provisions;

Figure 3 is a side view of Figure 2; and

Figure 4 is fragmentary perspective view of the ridged stock produced according to our invention.

As illustrated in Figure 1 we may use an extruder of the usual kind comprising a cylinder 1, a forcing screw 2 therein, a die box 3 and a die 4. Compounded rubber is fed into the cylinder down chute 5 and is forced by the screw via the die box through the die, the latter having an orifice 6 shaped to give the required cross-section of raw tire stock. From the orifice 6 the stock passes onto a roller conveyor 7 along which it progresses, by the feed which it receives from the screw 2, to the usual subsequent operations.

The preferred mechanism for ridging the extruded material is shown in detail in Figures 2 and 3. On the face of the die 4 there is secured by bolts 8 a pair of guides 9 in which slide a pair of links 10 which are yoked by strap 11 so as to become in effect a single rigid unit.

At their upper ends said links 10 are pivoted by bearing pins 12 to short links 13 which are journalled at 14 on eccentrics 15 which are keyed to shaft 16. Said eccentrics are secured longitudinally by flanged sleeves 17 held by taper pegs 18. Shaft 16 is journalled in bearings 19 carried by brackets 20, bolted at 21 to lugs 22 formed on the body of the cylinder 1. Said shaft 16 is rotated by motor 23, reduction gear 24, chain 25 and sprocket 26.

At their lower ends links 10 are formed with lateral projections 27 to which is fixed by screws 28 the reciprocating blade 29 hereinbefore referred to. As shown in full lines in Figure 2 said blade is at the bottom of its stroke; its position when at the top of its stroke is shown at 30 in chain dotted line, the blade moving into overlapping relationship with the die orifice 6 by an amount equivalent to the throw of the eccentrics 15.

The preferred procedure is as follows: concurrently with extrusion of the material through die orifice 6 and the progression of said material on conveyor 7, motor 23 rotates shaft 16 and this rotates eccentrics 15 within the bearings 14 of short links 13 with the result that the blade-carrying links 10 rise and fall in their guides 9. This causes blade 29 continually and repetitively to chop into the extruding material. The combined effect of reciprocation of the blade and progression of the extruded material is to produce a series of ridges 31 in the base of the stock as shown in Figure 4.

In the preferred arrangement the bottom surface of the extruded material forms the base of the raw tire stock, i. e. the surface which will ultimately be secured to the base band of the tire, and accordingly the blade moves upwardly in its operative strokes. Alternatively however, the blade may be disposed above the orifice 6 and move downwardly in its operative strokes; then the top surface of the extruded material would ultimately form the base of the raw tire stock.

Having described our invention what we claim is:

1. A method of producing raw tire stock from compounded rubber material which comprises extruding said material through a die in the form of a strip and then scoring one surface of the strip transversely thereof at intervals closely spaced longitudinally of the strip by successively cutting through a portion only of the thickness of the strip immediately upon the emergence of the strip from the extrusion die.

2. A method of producing raw tire stock which comprises extruding a plastic tire stock composition through a die to form a continuous strip and then cutting into the extruded strip at rapid intervals immediately upon its emergence from the extrusion die for a portion only of the thickness of the strip to score one surface of the strip transversely thereof at intervals closely spaced longitudinally of the strip.

3. A method of producing a strip of raw tire stock with a broken surface grain which comprises extruding a plastic tire stock composition progressively through a die to form a continuous strip and reciprocating a transverse scoring blade at rapid successive intervals into said extruded tire stock as it emerges from said die to cut through a portion only of the thickness of the stock and score one surface of the strip transversely at intervals closely spaced longitudinally of said strip.

WILLIAM GEORGE MACKESY PEARE.
GEORGE HENRY BERNARD YOXON.